US012715275B2

(12) United States Patent
Kakihara

(10) Patent No.: US 12,715,275 B2
(45) Date of Patent: Aug. 25, 2026

(54) WATER DRAINAGE MEMBER FOR SUNROOF

(71) Applicant: Webasto SE, Stockdorf (DE)

(72) Inventor: Kazuki Kakihara, Hiroshima-ken (JP)

(73) Assignee: WEBASTO SE, Stockdorf (DE)

( * ) Notice: Subject to any disclaimer, the term of this patent is extended or adjusted under 35 U.S.C. 154(b) by 404 days.

(21) Appl. No.: 18/277,503

(22) PCT Filed: Feb. 17, 2022

(86) PCT No.: PCT/EP2022/053956
§ 371 (c)(1),
(2) Date: Aug. 16, 2023

(87) PCT Pub. No.: WO2022/184461
PCT Pub. Date: Sep. 9, 2022

(65) Prior Publication Data

US 2024/0131908 A1 Apr. 25, 2024
US 2024/0227522 A9 Jul. 11, 2024

(30) Foreign Application Priority Data

Mar. 5, 2021 (JP) ................................ 2021-035261

(51) Int. Cl.
*B60J 7/00* (2006.01)
*B60J 7/043* (2006.01)

(52) U.S. Cl.
CPC ............ *B60J 7/0084* (2013.01); *B60J 7/043* (2013.01)

(58) Field of Classification Search
CPC ............................... B60J 7/0084; B60J 7/043
See application file for complete search history.

(56) References Cited

U.S. PATENT DOCUMENTS 1,207,082 A * 12/1916 Saunders ................ B60J 7/022 296/213
2,410,332 A * 10/1946 Ball ........................ B60J 7/022 296/213

(Continued)

FOREIGN PATENT DOCUMENTS

CN 105612071 A 5/2016
CN 205417120 U 8/2016

(Continued)

OTHER PUBLICATIONS

JP2011194918A; Hirata Tetsuya; Drainage Device of Vehicle Roof; (Year: 2011).*

(Continued)

*Primary Examiner* — Jonathan Malikasim
(74) *Attorney, Agent, or Firm* — Fitch, Even, Tabin & Flannery, LLP

(57) ABSTRACT

A sunroof water drainage member, which is I-shaped and mounted to lie across a sunroof opening, and has a body portion extending the vehicle width, and a pair of water drainage portions on both sides of the body portion in the vehicle width direction. Each water drainage portion may have a main portion connected to the body portion and extending in a vehicle longitudinal direction; a first tip end portion connected to a front end of the main portion in the longitudinal direction; a second tip end portion connected to a rear end of the main portion in the longitudinal direction; and a first wall portion positioned on the opposite side of the main portion to the body portion in the vehicle width direction, and at least a part of the first tip end portion and part of the second tip end portion are each positioned below the main portion.

8 Claims, 9 Drawing Sheets

(56) References Cited

U.S. PATENT DOCUMENTS

| | | | | |
|---|---|---|---|---|
| 7,905,542 | B2 * | 3/2011 | Marx | B60J 7/022<br>296/213 |
| 9,623,734 | B2 * | 4/2017 | Maeda | B60J 7/0084 |
| 2010/0320808 | A1 | 12/2010 | Marx | |
| 2015/0343887 | A1 | 12/2015 | Bojanowski | |
| 2016/0114665 | A1 | 4/2016 | Fukami | |
| 2016/0229273 | A1 | 8/2016 | Maeda | |
| 2017/0368921 | A1 | 12/2017 | Katsuramaki | |
| 2019/0366815 | A1 | 12/2019 | Van Aken | |
| 2020/0086723 | A1 | 3/2020 | Wedekind | |
| 2025/0249732 | A1 * | 8/2025 | Fukada | B60J 7/0084 |

FOREIGN PATENT DOCUMENTS

| | | | |
|---|---|---|---|
| DE | 102017209963 | A1 | 12/2017 |
| JP | S57165570 | U | 10/1982 |
| JP | S6050020 | U | 3/1985 |
| JP | 2001055047 | A | 2/2001 |
| JP | 2008063742 | A | 3/2008 |
| JP | 2011194918 | A | 10/2011 |
| JP | 2015058714 | A | 3/2015 |
| JP | 2016083956 | A | 5/2016 |
| JP | 6210809 | B2 | 10/2017 |
| JP | 2018154160 | A | 10/2018 |

OTHER PUBLICATIONS

International Search Report for PCT/EP2022/053956; mailed date May 31, 2022; In English (2 pages).

Office Action issued in corresponding Chinese Application No. 202280019292.6; mailed Jan. 19, 2026; in Chinese with English machine translation (16 pages).

Office Action issued in corresponding Chinese Application No. 202280019292.6; date mailed: Jun. 4, 2026; in Chinese with English machine translation (12 pages) References cited therein have been submitted to the USPTO in previous IDS.

* cited by examiner

[Fig. 1]
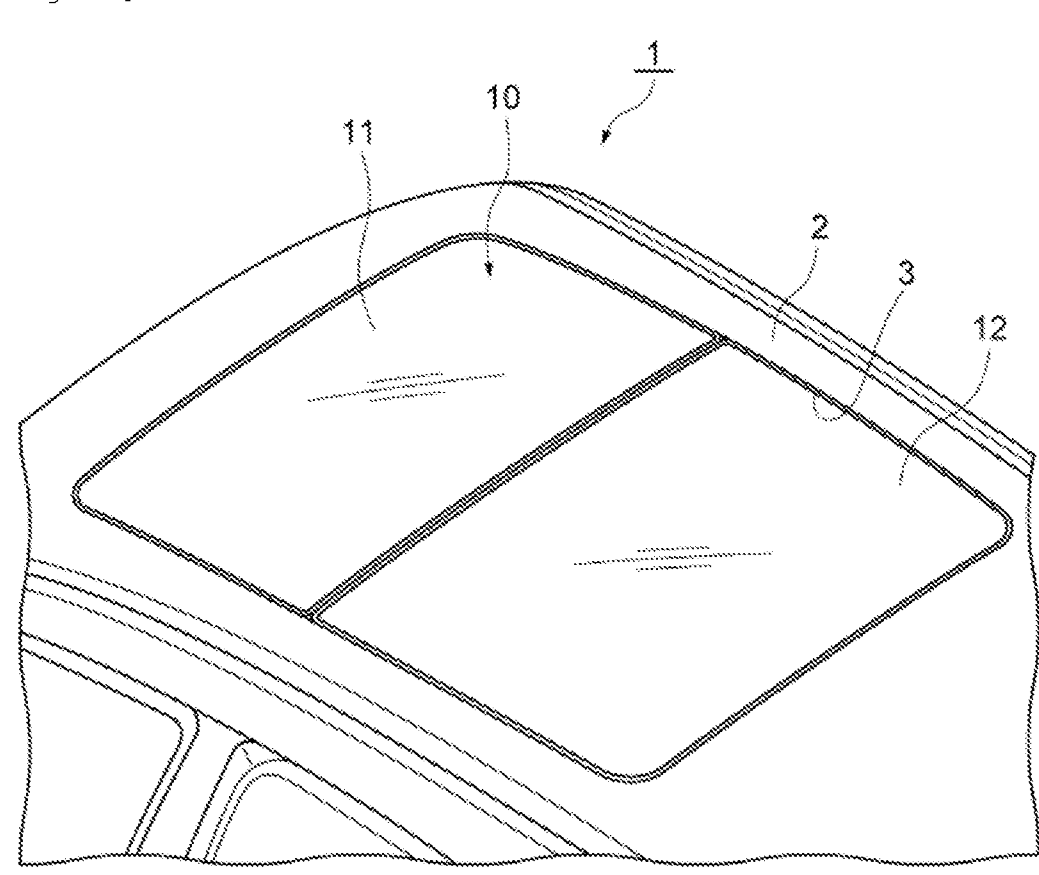
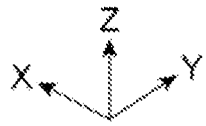

[Fig. 2]
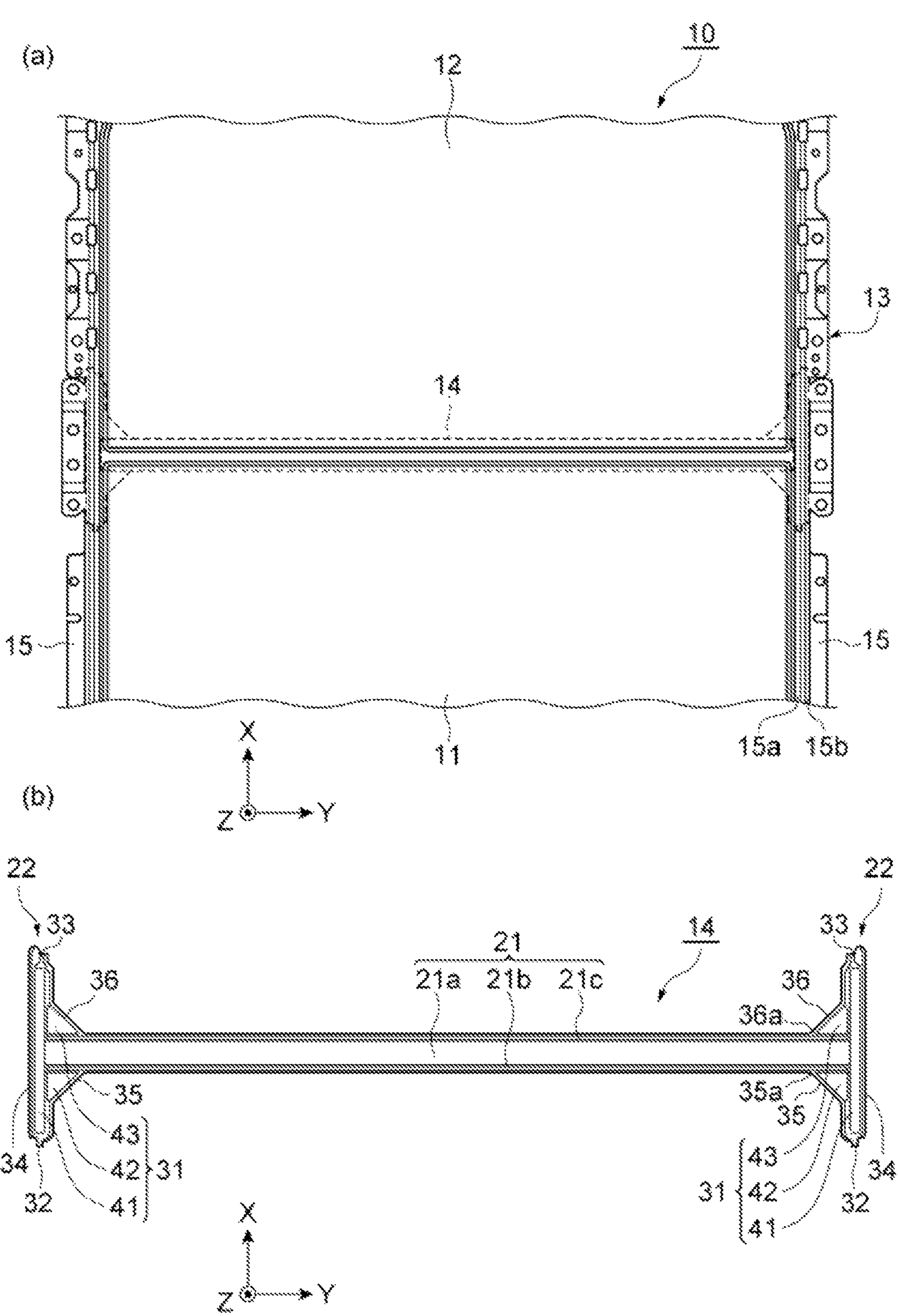

[Fig. 3]
(a)
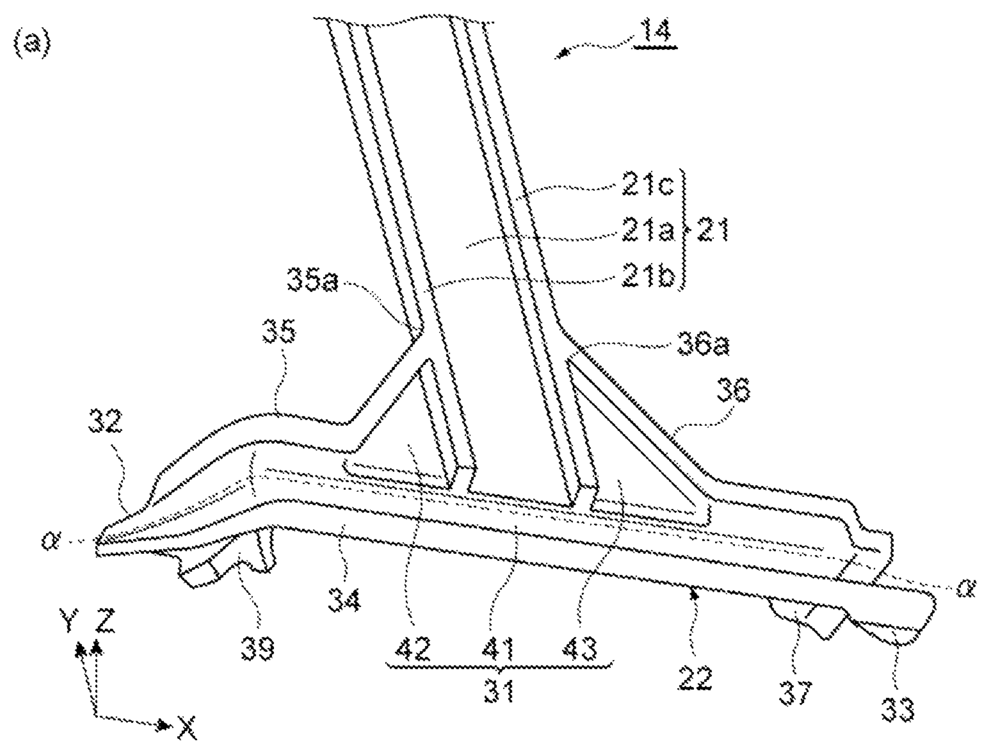
(b)
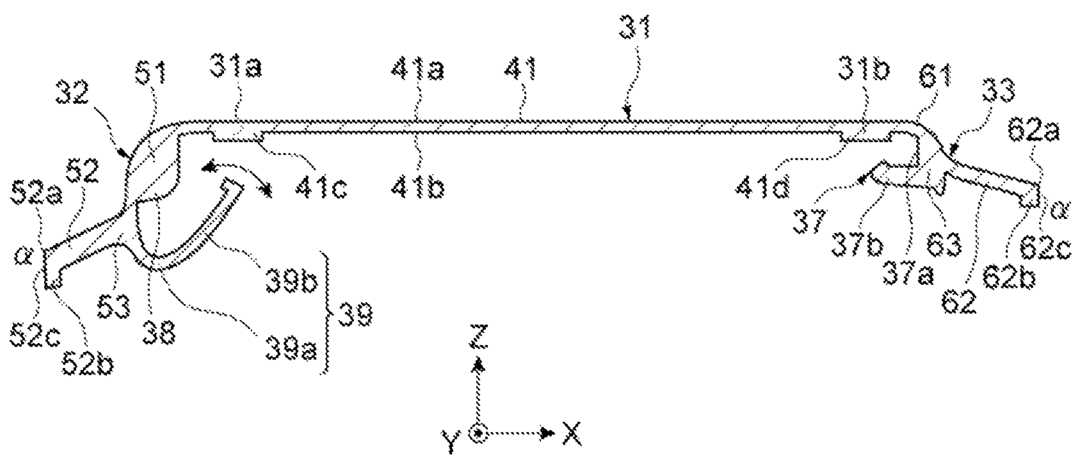

[Fig. 4]
(a)
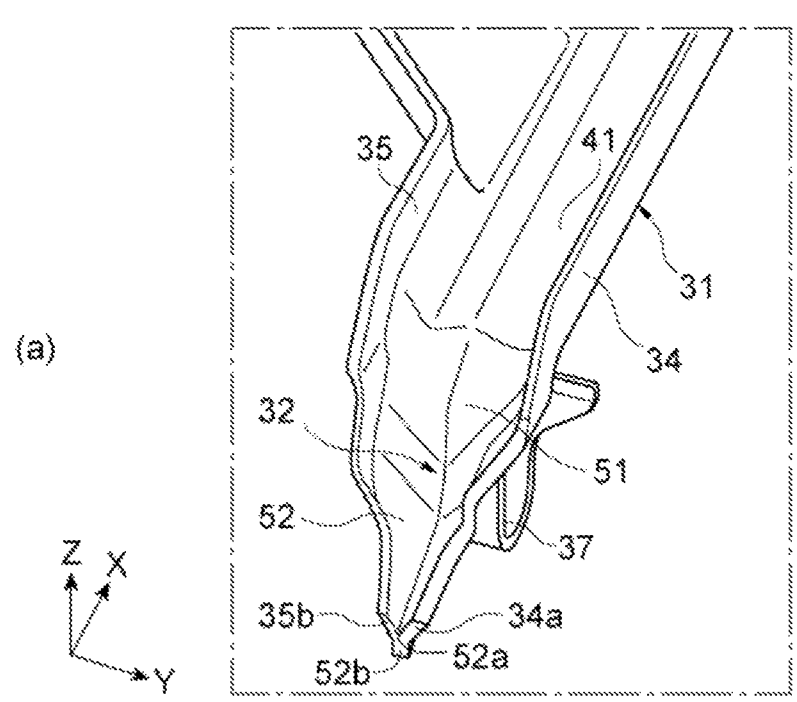
(b)
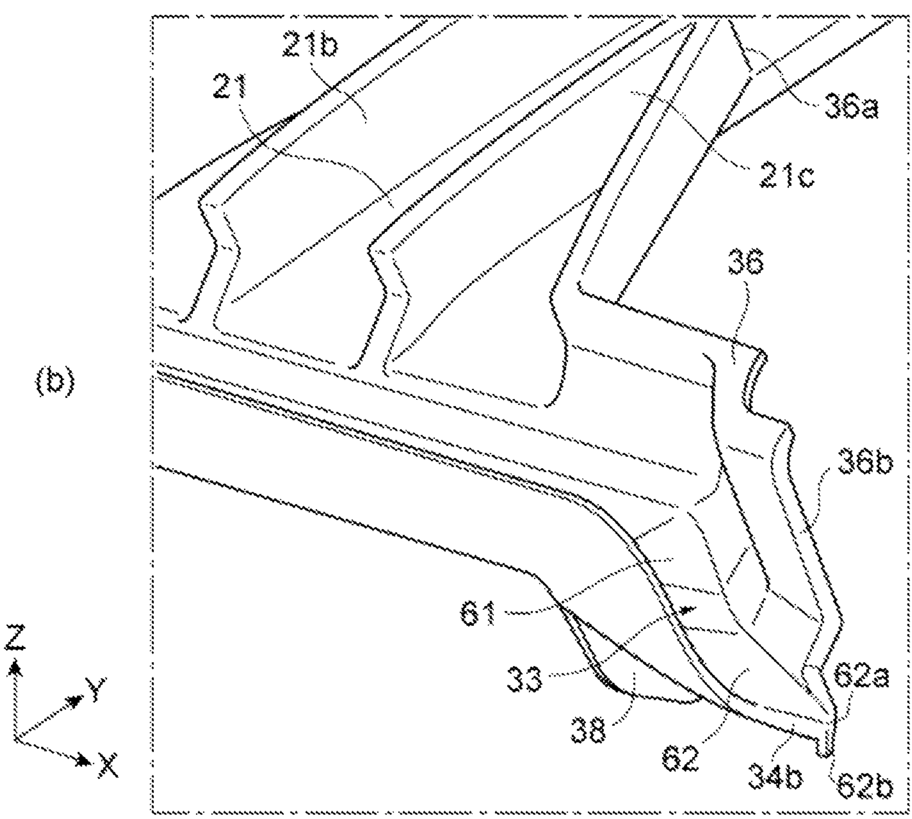

[Fig. 5]
(a)
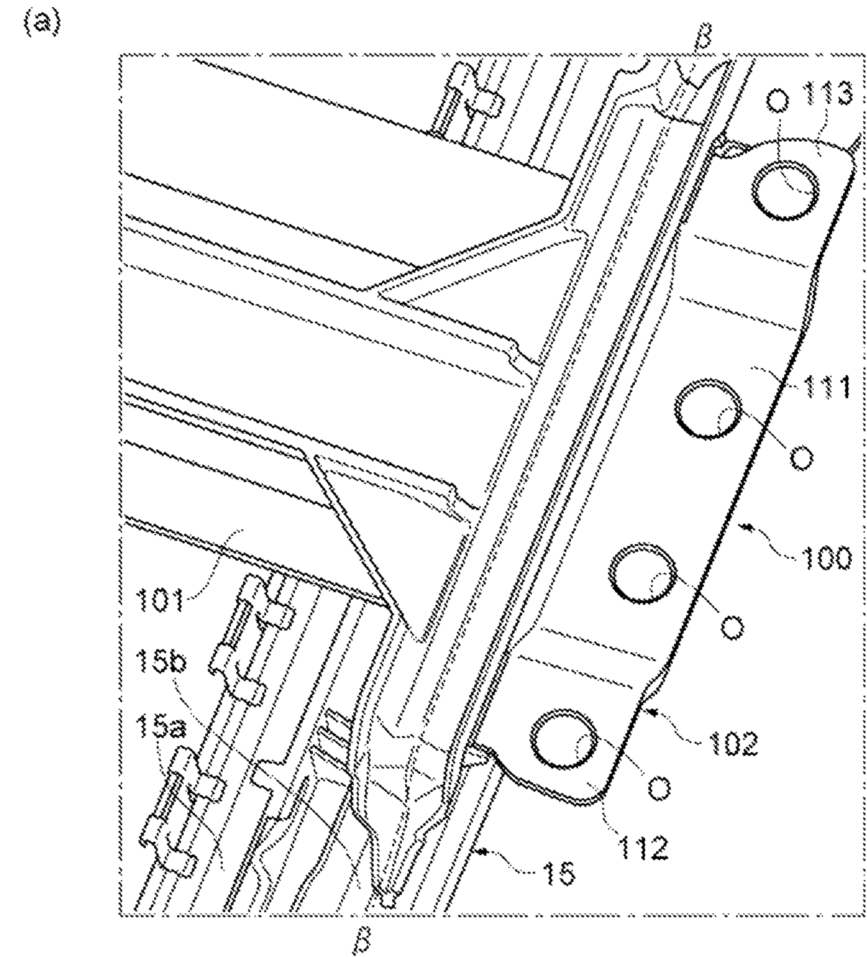
(b)
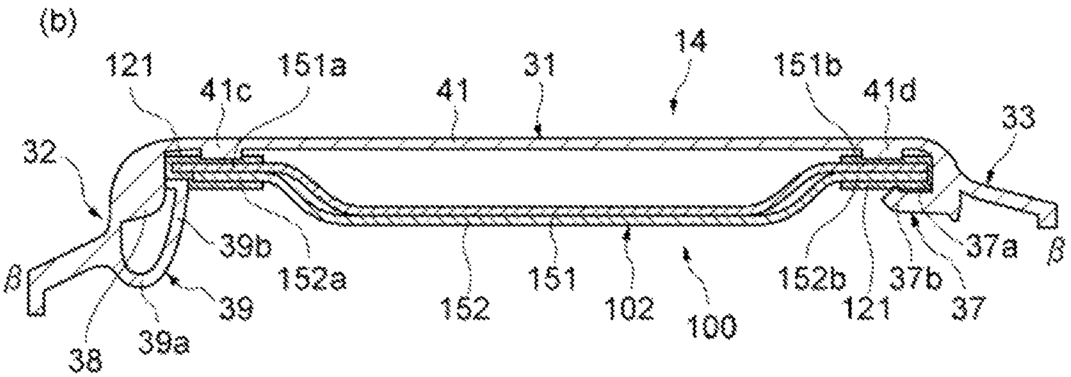

WATER DRAINAGE MEMBER FOR SUNROOF

CROSS-REFERENCE TO RELATED APPLICATIONS

This application is a U.S. national phase application filed under 35 U.S.C. § 371 of International Application No. PCT/EP2022/053956, filed on Feb. 17, 2022, published under WO 2022/184461A1 on Sep. 9, 2022, designating the United States, which claims priority from Japanese Patent Application Number 2021-035261, filed on Mar. 5, 2021, which are hereby incorporated herein by reference in their entirety for all purposes.

FIELD

The present invention relates to a water drainage member for a sunroof.

BACKGROUND

Conventionally, a sunroof may be provided in a roof panel of a vehicle such as a motor vehicle. When a sunroof is provided in a vehicle, it is necessary to prevent the ingress of water into a vehicle compartment through a gap between the sunroof and the roof panel, etc. For example, Patent Document 1 indicated below describes a sunroof structure in which water that has dropped down into the vehicle compartment from a peripheral edge portion of a sunroof opening is caught and drained to a water drainage groove in a sunroof side rail. In this sunroof structure, two water drainage members are each positioned between the peripheral edge portion and a reinforcing member, and are formed as a single piece with a seal retainer of a rear glass panel.

PRIOR ART DOCUMENTS

Patent Documents

Patent Document 1: JP 6210809 B2

SUMMARY

Abovementioned Patent Document 1 envisages preventing the ingress of water falling from the peripheral edge portion of the sunroof opening. However, Patent Document 1 does not envisage preventing the ingress of water through a gap between a front glass panel and the rear glass panel, etc., for example. When the intention is to prevent the ingress of water through the abovementioned gap, etc., it would therefore be feasible to provide a different water drainage member from the two water drainage members mentioned above. In such a case, this would increase the number of components for preventing the ingress of water into the vehicle compartment.

An objective according to one aspect of the present disclosure lies in providing a water drainage member for a sunroof, which can advantageously prevent the ingress of water into a vehicle compartment while also restricting an increase in the number of components.

A water drainage member for a sunroof according to one aspect of the present disclosure is I-shaped in plan view and is mounted on a vehicle so as to lie across a sunroof opening, the water drainage member for a sunroof comprising: a body portion extending in a vehicle width direction, and a pair of water drainage portions positioned on both sides of the body portion in the vehicle width direction. Each of the pair of water drainage portions comprises: a main portion connected to the body portion and extending in a vehicle longitudinal direction; a first tip end portion connected to a front end of the main portion in the vehicle longitudinal direction; a second tip end portion connected to a rear end of the main portion in the vehicle longitudinal direction; and a first wall portion positioned on the opposite side of the main portion to the body portion in the vehicle width direction and standing upright from the main portion, and at least a part of the first tip end portion and at least a part of the second tip end portion are each positioned below the main portion.

The water drainage member is I-shaped in plan view and is mounted on the vehicle so as to lie across the sunroof opening. A water drainage member such as this is disposed below a gap between a front glass panel and a rear glass panel of the sunroof, which thereby allows water penetrating into the vehicle compartment from between the front glass panel and the rear glass panel to be caught by the body portion. Furthermore, each of the pair of water drainage portions has a main portion which is connected to an end of the body portion extending in the vehicle width direction, and extends in the vehicle longitudinal direction. For example, the main portions are each positioned below edges of the sunroof opening, which thereby makes it possible to prevent the ingress of water into the vehicle compartment from between those edges and the front glass panel and the rear glass panel. It is therefore possible, by means of a single water drainage member, to prevent the ingress of water into the vehicle compartment from the edges of the sunroof opening and to prevent the ingress of water into the vehicle compartment from between the front glass panel and the rear glass panel. Additionally, each of the pair of water drainage portions comprises the first wall portion positioned on the opposite side of the main portion to the body portion in the vehicle width direction. In this case, for example, water that has flowed from the body portion to the water drainage portions along the vehicle width direction strikes against the first wall portion. As a result, this water is unlikely to flow out over the main portion, and readily flows towards the first tip end portion and/or the second tip end portion. The water on the water drainage portions is then advantageously drained via the first tip end portion and/or the second tip end portion. In addition, providing the first wall portion makes it possible to suppress external leakage of the water on the main portion caused by vehicle vibration, etc. According to one aspect of the present disclosure, it is therefore possible to provide a water drainage member for a sunroof, which can advantageously prevent the ingress of water into a vehicle compartment while also restricting an increase in the number of components.

The first tip end portion may be tapered towards the front of the vehicle, and the second tip end portion may be tapered towards the rear of the vehicle. In this case, the first tip end portion and the second tip end portion can each streamline the flow of water while also increasing the flow rate of the water. As a result, water that has reached the water drainage portions is more advantageously drained via the first tip end portion and/or the second tip end portion.

Each of the pair of water drainage portions may further comprise: a second wall portion which is positioned further to the front of the vehicle than the body portion, on the opposite side of the main portion to the first wall portion in the vehicle width direction; and a third wall portion which is positioned further to the rear of the vehicle than the body portion, on the opposite side of the main portion to the first wall portion in the vehicle width direction, and, in the vehicle longitudinal direction: one end of the first wall portion may be positioned at a tip end of the first tip end portion, another end of the first wall portion may be positioned at a tip end of the second tip end portion, one end of the second wall portion and one end of the third wall portion may each be positioned above the main portion, and another end of the second wall portion may be positioned at the tip end of the first tip end portion and/or another end of the third wall portion may be positioned at the tip end of the second tip end portion. In this case, it is possible to advantageously suppress external leakage of water on the main portion caused by vehicle vibration, etc.

Each of the pair of water drainage portions may further comprise: a second wall portion which is positioned further to the front of the vehicle than the body portion, on the opposite side of the main portion to the first wall portion in the vehicle width direction; and a third wall portion which is positioned further to the rear of the vehicle than the body portion, on the opposite side of the main portion to the first wall portion in the vehicle width direction, and, in the vehicle longitudinal direction: one end of the first wall portion may be positioned at a tip end of the first tip end portion, another end of the first wall portion may be positioned at a tip end of the second tip end portion, one end of the second wall portion and one end of the third wall portion may each be positioned above the main portion, and another end of the second wall portion may be positioned between the main portion and the tip end of the first tip end portion in the vehicle longitudinal direction and/or another end of the third wall portion may be positioned between the main portion and the tip end of the second tip end portion in the vehicle longitudinal direction. In this case, it is possible to advantageously suppress external leakage of water on the main portion caused by vehicle vibration, etc.

A projection that protrudes downwards may be provided at a tip end of at least one of the first tip end portion and the second tip end portion. In this case, water that has reached the tip end of at least one of the first tip end portion and the second tip end portion is drained via the projection. As a result, a direction of water drainage from the relevant tip end is readily guided in the desired direction.

The water drainage member may be mounted on a reinforcement included in the vehicle and extending in the vehicle width direction, and each of the pair of water drainage portions may comprise: a gripping portion which is positioned below the main portion in the vehicle longitudinal direction and grips the reinforcement; and a restricting portion which is positioned below the main portion in the vehicle longitudinal direction and restricts movement of the reinforcement in the vehicle longitudinal direction. In this case, the water drainage member can be fixed onto the reinforcement by way of the gripping portion and the restricting portion, so it is possible to suppress an increase in the number of components. Additionally, the water drainage member is attached to the reinforcement, which means that the water drainage member and the reinforcement can be counted as a single member. As a result, there is no longer any need to take account of a space between the water drainage member and the reinforcement at the design stage. Consequently, there is no longer any need to maintain this space inside the vehicle in which the sunroof is installed, so the sunroof can be made thinner. Furthermore, sunroof design can also be simplified.

The water drainage member may be a moulding integrally moulded with a reinforcement included in the vehicle and extending in the vehicle width direction. In this case, the water drainage member is integral with the reinforcement, so there is substantially no longer any space between the water drainage member and the reinforcement. In this case, there is no longer any need to maintain this space inside the vehicle compartment in which the sunroof is installed, so the sunroof can be made thinner.

The water drainage member may be mounted on a pair of side rails included in the sunroof, and each of the pair of water drainage portions may be linked to the corresponding side rail. In this case, the water which is drained from the drainage portions is directly fed to the side rails, so this water can be advantageously drained to outside the vehicle.

The water drainage member may be mounted on a reinforcement included in the vehicle and extending in the vehicle width direction, each of the pair of water drainage portions may comprise a hook portion which protrudes downwards from a bottom face of the main portion, and the hook portion may be positioned within an opening provided in the reinforcement. In this case, the hook portion abuts the edge of the opening when the water drainage member moves in relation to the reinforcement in the vehicle longitudinal direction. This makes it possible to suppress misalignment of the water drainage member and the reinforcement in the vehicle longitudinal direction.

Advantageous Effects

According to one aspect of the present disclosure, it is possible to provide a water drainage member for a sunroof, which can advantageously prevent the ingress of water into a vehicle compartment while also restricting an increase in the number of components.

BRIEF DESCRIPTION OF THE DRAWINGS

FIG. 1 is a schematic oblique view showing part of a vehicle in which a sunroof is installed.

FIG. 2(*a*) is a schematic plan view showing part of the sunroof, and FIG. 2(*b*) is a schematic plan view showing a water drainage member for a sunroof.

FIG. 3(*a*) is a schematic enlargement of an oblique view showing the main parts of the water drainage member, and FIG. 3(*b*) is an end face view along the line α-α in FIG. 3(*a*).

FIG. 4(*a*) is a schematic enlargement of an oblique view of a part of a water drainage portion, and FIG. 4(*b*) is a schematic enlargement of an oblique view of a different part of the water drainage portion.

FIG. 5(*a*) is a main part enlargement of an oblique view of a situation in which the water drainage member has been mounted on a reinforcement, and FIG. 5(*b*) is an end face view along the line in FIG. 5(*a*).

FIG. 9 is a schematic end face view showing the main parts of a water drainage member according to a variant example.

DETAILED DESCRIPTION

Figure 6:
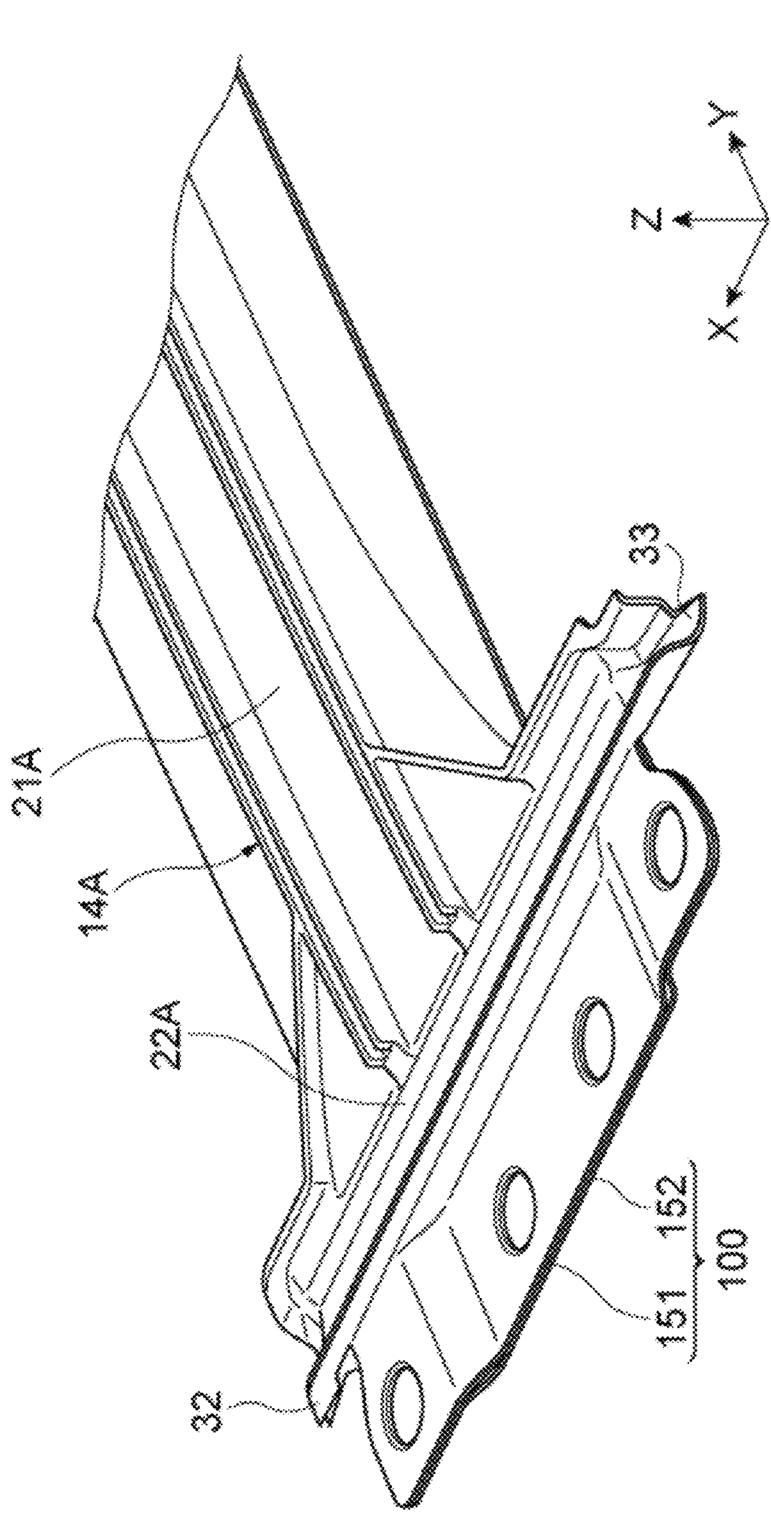
FIG. 6 is a schematic oblique view showing the main parts of a water drainage member according to a first variant example.

An embodiment of one aspect of the present invention will be described in detail below with reference to the appended drawings. It should be noted that the same reference symbols are used in the following description for components which are the same or components which have the same function, and duplicate descriptions will not be given. It should also be noted that "same" and similar words in the present specification are not limited only to "completely the same".

FIG. 1 is a schematic oblique view showing part of a vehicle in which a sunroof is installed. As shown in FIG. 1, an opening 3 having a rectangular shape in plan view is provided in a roof panel 2 included in a vehicle 1 such as a motor vehicle. The opening 3 is an opening for a sunroof 10 (a sunroof opening) which will be described later. In this embodiment, the opening 3 is provided in the centre of the roof panel 2, for example. In the following description, a vehicle longitudinal direction X denotes a direction along the front-to-rear length of the vehicle 1, a vehicle width direction Y denotes a direction along the width of the vehicle 1, and a vehicle vertical direction Z denotes a direction along the height of the vehicle 1. Furthermore, a view along the vehicle vertical direction Z corresponds to a plan view.

FIG. 2(*a*) is a schematic plan view showing part of the sunroof. The sunroof 10 shown in FIG. 2(*a*) is an openable and closable overhead window, and is installed in the roof panel 2 and a frame, etc. of the vehicle 1, for example. In this embodiment, the sunroof 10 is fitted to the vehicle 1 from a lower side of the roof panel 2 by way of brackets and bolts, etc., but this is not limiting. The sunroof 10 may be installed in the vehicle 1 from an upper side of the roof panel 2. The sunroof 10 comprises a front glass panel 11, a rear glass panel 12, a main frame 13, and a water drainage member 14. It should be noted that the sunroof 10 also has components including a glass panel drive mechanism for driving the front glass panel 11 and/or the rear glass panel 12, a sunshade, a shade drive mechanism for driving the sunshade, and a deflector, but a detailed description of these components will be omitted.

The front glass panel 11 and the rear glass panel 12 are members provided within the opening 3 and are arranged in succession in the vehicle longitudinal direction X. The front glass panel 11 and the rear glass panel 12 each have a rectangular shape in plan view, and have a curved shape protruding upwards as seen from the vehicle longitudinal direction X, for example. The front glass panel 11 and the rear glass panel 12 are each capable of transmitting light. At least one of the front glass panel 11 and the rear glass panel 12 may therefore be fully light transmissive, or may selectively transmit some light, or else may have a function for blocking UV radiation. A resin seal may be held around the whole outer peripheral edge of at least one of the front glass panel 11 and the rear glass panel 12 from the point of view of sealing off a gap between the front glass panel 11 and the rear glass panel 12, and a gap between the rear glass panel 12 and the edge of the opening 3, etc., although this is not depicted. It should be noted that in the following, water passing through the gap between the front glass panel 11 and the rear glass panel 12 is not limited to water passing through the gap between the glass panels, and also includes water passing through an area of abutment between a member surrounding the front glass panel 11 and a member surrounding the rear glass panel 12.

In this embodiment, the front glass panel 11 is mounted on a slide mechanism (not depicted) included in the glass panel drive mechanism. The front glass panel 11 is therefore provided in such a way as to be slidable towards the rear of the vehicle along with operation of the slide mechanism. For example, the front glass panel 11 may be moved upwards and then moved by sliding to the rear of the vehicle, or it may be moved downwards and then moved by sliding to the rear of the vehicle. Furthermore, the front glass panel 11 may be inclined so that a front end thereof moves downwards while a rear end thereof also moves upwards (a tilt-up mechanism). In this embodiment, the rear glass panel 12 is fixedly attached to the main frame 13 or to a member fixed to the main frame 13, but this is not limiting. For example, the rear glass panel 12 may also be mounted on a separate slide mechanism included in the glass panel drive mechanism. In this case, the rear glass panel 12 moves by sliding to the rear of the vehicle in collaboration with the front glass panel 11, for example.

The main frame 13 is a member which directly or indirectly supports the front glass panel 11 and the rear glass panel 12, etc., and is substantially U-shaped in plan view, for example. In this embodiment, the main frame 13 is formed by: a pair of sunroof side rails 15, 15 (side rails) arranged along the vehicle width direction Y while extending along the vehicle longitudinal direction X; and a front frame part (not depicted) which is positioned further towards the front of the vehicle than the front glass panel 11 while extending along the vehicle width direction Y. The sunroof side rails 15 are connected to the front frame part (not depicted).

The sunroof side rails 15 each comprise a slide groove 15*a* and a water drainage groove 15*b*. The slide groove 15*a* is a portion in which the slide mechanism is arranged. The slide groove 15*a* extends along the vehicle longitudinal direction X and is positioned below the peripheral edge portion of the opening 3, for example. The slide mechanism moves by sliding along the slide groove 15*a*. The water drainage groove 15*b* is a portion for draining, to the vehicle exterior, water penetrating to the interior of the vehicle 1 from the sunroof 10. The water drainage groove 15*b* extends along the vehicle longitudinal direction X and is positioned outside of the slide groove 15*a* in the vehicle width direction Y. An opening (not depicted), for example, is provided at both ends of the water drainage groove 15*b* in the vehicle longitudinal direction X, for example. A hose, etc. for draining water that has collected in the water drainage groove 15*b* to outside the vehicle may be fitted to this opening, for example.

FIG. 2(*b*) is a schematic plan view showing a water drainage member for a sunroof. FIG. 3(*a*) is a schematic enlargement of an oblique view showing the main parts of the water drainage member, and FIG. 3(*b*) is an end face view along the line α-α in FIG. 3(*a*). The water drainage member 14 is a member for draining, to the water drainage groove 15*b*, water penetrating to the interior of the vehicle 1 from the sunroof 10. The water drainage member 14 can therefore also be referred to as a water drainage member for a sunroof. The water drainage member 14 is I-shaped in plan view and is mounted on the vehicle 1 so as to lie across the opening 3 in the vehicle width direction Y. In this embodiment, the water drainage member 14 is not mounted on the main frame 13, rather it is mounted on a member included in the vehicle 1 (this will be described in detail later). A part of the water drainage member 14 is positioned below the front glass panel 11, and a different part of the water drainage member 14 is positioned below the rear glass panel 12, in the vehicle longitudinal direction X. Furthermore, the water drainage member 14 is positioned below the front glass panel 11 and the rear glass panel 12, and above the main frame 13, in the vehicle vertical direction Z. The water drainage member 14 is an elastic resin moulding, for example, from the point of view of weight, waterproofing and ease of processing, etc.

As shown in FIG. 2(*b*), the water drainage member 14 comprises: a body portion 21 extending in the vehicle width direction Y; and a pair of water drainage portions 22, 22 positioned at both ends of the body portion 21 in the vehicle width direction Y. In this embodiment, the body portion 21 and the pair of water drainage portions 22, 22 are integrally moulded.

The body portion 21 of the water drainage member 14 is a portion for unifying the pair of water drainage portions 22, 22, and has a rectangular shape in plan view. A part of the body portion 21 is positioned below the front glass panel 11, and a different part of the body portion 21 is positioned below the rear glass panel 12, in the vehicle longitudinal direction X. In this embodiment, the body portion 21 comprises: a bottom portion 21*a* extending along the vehicle width direction Y; a wall portion 21*b* standing upright from a front end side of the bottom portion 21*a* in the vehicle longitudinal direction X; and a wall portion 21*c* standing upright from a rear end side of the bottom portion 21*a* in the vehicle longitudinal direction X. The bottom portion 21*a* is a portion for catching water penetrating into the interior of the vehicle 1 through the gap between the front glass panel 11 and the rear glass panel 12, for example. The bottom portion 21*a* has a curved shape protruding upwards as seen from the vehicle longitudinal direction X, from the point of view of easily directing water on the bottom portion 21*a* towards the water drainage portion 22. In other words, a central portion of the bottom portion 21*a* is positioned above end portions of the bottom portion 21*a* in the vehicle width direction Y. Furthermore, the bottom portion 21*a* is inclined downwards from the central portion towards the end portions. The wall portions 21*b*, 21*c* are portions for restricting unanticipated leakage of water lying on the bottom portion 21*a*, and they extend along the vehicle width direction Y in the same way as the bottom portion 21*a*. Additionally, the rigidity of the body portion 21 can be enhanced by providing the wall portions 21*b*, 21*c* on the body portion 21. There is no particular limitation as to the height of the wall portions 21*b*, 21*c*, provided that they do not interfere with other components. Moreover, the wall portions 21*b*, 21*c* need not be provided on the body portion 21.

Each of the pair of water drainage portions 22, 22 is a portion for draining, from the exterior, water fed from the body portion 21. In the vehicle longitudinal direction X, the dimensions of the water drainage portions 22 are greater than the dimensions of the body portion 21, and a part of the water drainage portions 22 is positioned further to the front of the vehicle than the body portion 21, while a different part of the water drainage portions 22 is positioned further to the rear of the vehicle than the body portion 21. The water drainage portions 22 each comprise: a main portion 31, a first tip end portion 32, a second tip end portion 33, a first wall portion 34, a second wall portion 35, a third wall portion 36, a gripping portion 37, a restricting portion 38, and a holding portion 39. In this embodiment, the first tip end portion 32 and the second tip end portion 33 have different shapes, but this is not limiting.

The main portion 31 is a portion for catching water flowing from the body portion 21, and extends in the vehicle longitudinal direction X while being connected to the main body portion 21. At least a part of the main portion 31 may be positioned below the edge of the opening 3. In this case, the main portion 31 advantageously catches water penetrating into the interior of the vehicle 1 from the edge of the opening 3. The main portion 31 comprises a water drainage passage 41, and reinforcing portions 42, 43. The water drainage passage 41 is the portion demonstrating the main function of the main portion 31 (i.e., catching water flowing from the body portion 21). The water drainage passage 41 is positioned below the body portion 21 in order to advantageously drain water from the body portion 21 to the main portion 31. A top face 41*a* of the water drainage passage 41 is substantially V-shaped, for example, as seen from the vehicle longitudinal direction X. Protrusions 41*c*, 41*d* that protrude downwards are provided on a bottom face 41*b* of the water drainage passage 41. The protrusion 41*c* is provided at a front end 31*a* of the main portion 31, and the protrusion 41*d* is provided at a rear end 31*b* of the main portion 31, in the vehicle longitudinal direction X. The reinforcing portions 42, 43 are provided in order to enhance the rigidity of the water drainage passage 41, for example. The reinforcing portion 42 connects the body portion 21 and a front side of the water drainage passage 41 in the vehicle longitudinal direction X. The other reinforcing portion 43 connects the body portion 21 and a rear side of the water drainage passage 41 in the vehicle longitudinal direction X. The reinforcing portions 42, 43 have a substantially triangular shape in plan view, for example, but this is not limiting. Each of the reinforcing portions 42, 43 overlaps either of a corner (rear corner) on a rear end side of the front glass panel 11 and a corner (front corner) on a front end side of the rear glass panel 12, or is positioned at the periphery of the abovementioned corners. A substantially T-shaped gap is formed at the periphery of the rear corner and the front corner, and water is likely to penetrate into the interior of the vehicle 1 from this gap. In view of this, the reinforcing portions 42, 43 are provided on the water drainage member 14 as in this embodiment so that water penetrating into the interior of the vehicle 1 from this gap can be caught not only by the body portion 21 but also by the reinforcing portions 42, 43.

FIG. 4(*a*) is a schematic enlargement of an oblique view of one part of the water drainage portion. As shown in FIGS. 3(*a*) and (*b*) and FIG. 4(*a*), the first tip end portion 32 is a portion for draining water on the water drainage portion 22 to the exterior, and is connected to the front end 31*a* of the main portion 31. The first tip end portion 32 is moulded in the shape of a beak as seen in a plan view, for example. At least a part of the first tip end portion 32 is tapered towards the front of the vehicle and is positioned below the main portion 31. The first tip end portion 32 is substantially V-shaped, for example, as seen from the vehicle longitudinal direction X, in the same way as the water drainage passage 41. The first tip end portion 32 comprises: a first inclined portion 51, a second inclined portion 52, and a junction 53 of the first inclined portion 51 and the second inclined portion 52. The first inclined portion 51 is a portion which is connected to the front end 31*a* of the main portion 31 and extends up to the junction 53, extending downwardly from the front end 31*a* towards the front of the vehicle. The second inclined portion 52 is a portion extending downwardly from the junction 53 towards the front of the vehicle. A tip end 52*a* of the second inclined portion 52 is positioned above the water drainage groove 15*b* of the sunroof side rail 15. A projection 52*b* that protrudes downwards is provided at the tip end 52*a*. By providing the projection 52*b*, water drained from the first tip end portion 32 is guided to the water drainage groove 15*b* via a surface 52*c* of the projection 52*b*. As a result, it is possible to suppress a situation in which the water drained from the first tip end portion 32 travels around towards the rear of the vehicle via a back face of the second inclined portion 52. The surface 52*c* of the projection 52*b* which is positioned furthest to the front of the vehicle may be orthogonal to or substantially orthogonal to the vehicle longitudinal direction X, from the point of view of advantageously suppressing this travelling around of the water. The projection 52_b_ of the tip end 52_a_ may be in contact with the water drainage groove 15_b_ in order to cause the water that has reached the first tip end portion 32 to reliably reach the water drainage groove 15_b_. The junction 53 is the portion which joins the first inclined portion 51 and the second inclined portion 52. In this embodiment, an angle of inclination of the first inclined portion 51 is not constant, and the angle of inclination of the second inclined portion 52 is constant, but this is not limiting. Furthermore, the inclination of the second inclined portion 52 is more gentle than the inclination of the first inclined portion 51, but this is not limiting.

FIG. 4(_b_) is a schematic enlargement of an oblique view of a different part of the water drainage portion. As shown in FIGS. 3(_a_) and (_b_) and FIG. 4(_b_), the second tip end portion 33 is a portion for draining water on the water drainage portion 22 to the exterior, and is connected to the rear end 31_b_ of the main portion 31. At least a part of the second tip end portion 33 is tapered towards the rear of the vehicle and is positioned below the main portion 31. The second tip end portion 33 is substantially V-shaped, for example, as seen from the vehicle longitudinal direction X, in the same way as the water drainage passage 41. The second tip end portion 33 comprises: a first inclined portion 61, a second inclined portion 62, and a junction 63 of the first inclined portion 61 and the second inclined portion 62. The first inclined portion 61 is a portion which is connected to the rear end 31_b_ of the main portion 31 and extends up to the junction 63, extending downwardly from the rear end 31_b_ towards the rear of the vehicle. The second inclined portion 62 is a portion extending downwardly from the junction 63 towards the rear of the vehicle. A tip end 62_a_ of the second inclined portion 62 is positioned above the water drainage groove 15_b_ of the sunroof side rail 15. A projection 62_b_ that protrudes downwards is provided at the tip end 62_a_. By providing the projection 62_b_, water drained from the second tip end portion 33 is guided to the water drainage groove 15_b_ via a surface 62_c_ of the projection 62_b_. As a result, it is possible to suppress a situation in which the water drained from the second tip end portion 33 travels around towards the front of the vehicle via a back face of the second inclined portion 62. The surface 62_c_ of the projection 62_b_ which is positioned furthest to the rear of the vehicle may be orthogonal to or substantially orthogonal to the vehicle longitudinal direction X, from the point of view of advantageously suppressing this travelling around of the water. The projection 62_b_ of the tip end 62_a_ may be in contact with the water drainage groove 15_b_ in order to cause the water that has reached the second tip end portion 33 to reliably reach the water drainage groove 15_b_. The junction 63 is the portion which joins the first inclined portion 61 and the second inclined portion 62. In this embodiment, an angle of inclination of the first inclined portion 61 is not constant, and the angle of inclination of the second inclined portion 62 is constant, but this is not limiting. Furthermore, the inclination of the second inclined portion 62 is more gentle than the inclination of the first inclined portion 61, but this is not limiting. Moreover, the inclination of the second inclined portion 52 included at the first tip end portion 32 is steeper than the inclination of the second inclined portion 62 included at the second tip end portion 33, but this is not limiting.

The first wall portion 34 is a portion for restricting an outflow from the main portion 31 of water that does not pass through the first tip end portion 32 or the second tip end portion 33, and it extends in the vehicle longitudinal direction X and the vehicle vertical direction Z. The first wall portion 34 further has a function of suppressing an outflow of water flowing in from the body portion 21, and a function for changing a flow direction of the water to the vehicle longitudinal direction X. It is additionally possible to enhance the rigidity of the main portion 31 by providing the first wall portion 34 on the main portion 31. The first wall portion 34 is positioned on the opposite side of the main portion 31 to the body portion 21 in the vehicle width direction Y. The first wall portion 34 is positioned on the outermost side of the water drainage portion 22 in the vehicle width direction Y. The first wall portion 34 stands upright from the main portion 31, the first tip end portion 32, and the second tip end portion 33. In the vehicle longitudinal direction X, one end 34_a_ of the first wall portion 34 is positioned at the tip end of the first tip end portion 32 (the tip end 52_a_ of the second inclined portion 52), and another end 34_b_ of the first wall portion 34 is positioned at the tip end of the second tip end portion 33 (the tip end 62_a_ of the second inclined portion 62). There is no particular limitation as to the height of the first wall portion 34, provided that it does not interfere with other components.

The second wall portion 35 is a portion for restricting an outflow of water from the main portion 31, in the same way as the first wall portion 34, and it extends in the vehicle longitudinal direction X and the vehicle vertical direction Z. The second wall portion 35 is positioned on the opposite side of the main portion 31 to the first wall portion 34 in the vehicle width direction Y and further towards the front of the vehicle than the body portion 21. The second wall portion 35 is positioned on the innermost side of the water drainage portion 22 in the vehicle width direction Y. The second wall portion stands upright from the main portion 31 and the first tip end portion 32. A part of the second wall portion 35 stands upright from the water drainage passage 41 of the main portion 31, and a different part of the second wall portion 35 stands upright from the reinforcing portion 42 of the main portion 31. In the vehicle longitudinal direction X, one end 35_a_ of the second wall portion 35 is positioned on the reinforcing portion 42 included on the main portion 31, and another end 35_b_ of the second wall portion 35 is positioned at the tip end of the first tip end portion 32 (the tip end 52_a_ of the second inclined portion 52). Said one end 35_a_ is joined to the wall portion 21_b_ of the body portion 21 from the point of view of strength of the main portion 31, but this is not limiting. There is no particular limitation as to the height of the second wall portion 35, provided that it does not interfere with other components.

The third wall portion 36 is a portion for restricting an outflow of water from the main portion 31, in the same way as the first wall portion 34, and it extends in the vehicle longitudinal direction X and the vehicle vertical direction Z. The third wall portion 36 is positioned on the opposite side of the main portion 31 to the first wall portion 34 in the vehicle width direction Y and further towards the rear of the vehicle than the body portion 21. The third wall portion 36 is positioned on the innermost side of the water drainage portion 22 in the vehicle width direction Y, in the same way as the second wall portion 35. The third wall portion 36 stands upright from the main portion 31 and the second tip end portion 33. A part of the third wall portion 36 stands upright from the water drainage passage 41 of the main portion 31, and a different part of the third wall portion 36 stands upright from the reinforcing portion 43 of the main portion 31. In the vehicle longitudinal direction X, one end 36_a_ of the third wall portion 36 is positioned on the reinforcing portion 43 included on the main portion 31, and another end 36*b* of the third wall portion 36 is positioned above the second tip end portion 33. Said one end 36*a* is joined to the wall portion 21*c* of the body portion 21 from the point of view of strength of the main portion 31, but this is not limiting. Said other end 36*b* is positioned between the main portion 31 and the tip end of the second tip end portion 33 (the tip end 62*a* of the second inclined portion 62). In other words, said other end 36*b* is positioned further to the front of the vehicle than said other end 34*b* of the first wall portion 34. There is no particular limitation as to the height of the third wall portion 36, provided that it does not interfere with other components.

The gripping portion 37 is a portion for gripping another component when the water drainage member 14 is mounted on that other component (to be described in detail later). The gripping portion 37 is positioned below the main portion 31, further to the rear of the vehicle than the body portion 21 in the vehicle longitudinal direction X. In this embodiment, one part of the gripping portion 37 extends towards the front of the vehicle from the second tip end portion 33, but this is not limiting. The gripping portion 37 comprises: a receiving portion 37*a* for receiving the abovementioned other component, and a free end 37*b* extending towards the front of the vehicle from a lower end of the junction 63. The receiving portion 37*a* has a face positioned on the opposite side to the first inclined portion 61 in the vehicle longitudinal direction X. The free end 37*b* is a portion capable of elastic deformation to restrict downward movement of another component when the water drainage member 14 is mounted on that other component, and it is positioned below the receiving portion 37*a*. A tip end of the free end 37*b* extends upwards and is positioned below the protrusion 41*d* of the water drainage passage 41. For example, when the water drainage member 14 is mounted on another component, that other component is held between the free end 37*b* and the protrusion 41*d* while abutting the receiving portion 37*a*.

The restricting portion 38 is a portion for restricting movement of another component in the vehicle longitudinal direction X when the water drainage member 14 is mounted on that other component. The restricting portion 38 is positioned below the main portion 31 and further to the front of the vehicle than the body portion 21 in the vehicle longitudinal direction X. In this embodiment, the restricting portion 38 protrudes towards the rear of the vehicle from the first tip end portion 32, but this is not limiting.

The holding portion 39 is a portion for imparting a biasing force to the other component on which the water drainage member 14 is mounted (to be described in detail later). The holding portion 39 is positioned below the main portion 31 and further to the front of the vehicle than the body portion 21. In this embodiment, the holding portion 39 extends towards the rear of the vehicle from the first tip end portion 32, but this is not limiting. The holding portion 39 has the shape of a claw or a hook capable of elastic deformation, for example. The holding portion 39 comprises: a base end portion 39*a* extending towards the rear of the vehicle from the lower end of the junction 53, and a biasing portion 39*b* extending upwards and towards the rear of the vehicle from the tip end of the base end portion 39*a*. The biasing portion 39*b* is the portion which demonstrates the abovementioned function of the holding portion 39. The biasing portion 39*b* is capable of elastic deformation so as to pivot about the base end portion 39*a*, for example, as seen from the vehicle width direction Y. A protrusion or a thickened portion, etc. may be provided at the tip end of the biasing portion 39*b* from the point of view of advantageously imparting the biasing force to said other component.

An example of a situation in which the water drainage member 14 has been mounted on another component will be described next with reference to FIGS. 5(*a*) and (*b*). In the following description, the other component is a reinforcement which is included on the vehicle 1 and extends in the vehicle width direction Y so as to lie across the opening 3 in the vehicle 1. FIG. 5(*a*) is a main part enlargement of an oblique view of a situation in which the water drainage member has been mounted on the reinforcement, and FIG. 5(*b*) is an end face view along the line β-β in FIG. 5(*a*).

As shown in FIGS. 5(*a*) and (*b*), a reinforcement 100 is a reinforcing component mounted on the frame, etc. of the vehicle 1, and is a processed metal sheet or alloy sheet, for example. In this embodiment, the reinforcement 100 is I-shaped in plan view. The reinforcement 100 therefore comprises a body portion 101, and a pair of wide portions 102, 102 connected to both ends of the body portion 101 in the vehicle width direction Y. The reinforcement 100 may have a hat-shaped cross section, etc. from the point of view of enhancing the rigidity of the reinforcement 100, for example. In this embodiment, the cross-sectional shape of the body portion 101 and the cross-sectional shape of each of the wide portions 102 are different hat shapes, but this is not limiting. It should be noted that the body portion 101 and the pair of wide portions 102, 102 are seamlessly provided.

The body portion 101 is the portion which demonstrates the function as the reinforcement 100, and it is positioned below the body portion 21 of the water drainage member 14. The body portion 101 has a substantially rectangular shape in plan view, for example, but this is not limiting. A gap is provided at least partially between the body portion 101 and the body portion 21. The wide portions 102 constitute mount-receiving portions on which the water drainage member 14 is mounted, and they are positioned below the main portion 31 of the water drainage portion 22 included in the water drainage member 14. The wide portions 102 may also be used as portions for mounting the reinforcement 100 on the frame, etc. of the vehicle 1. A dimension of the wide portions 102 in the vehicle longitudinal direction X may be longer than a dimension of the body portion 101 in the vehicle longitudinal direction X, as seen in plan view. A plurality of openings O enabling insertion of bolts, etc. are provided in the wide portions 102. Furthermore, the wide portions 102 comprise: a channel portion 111, a flange portion 112 positioned further to the front of the vehicle than the channel portion 111, and a flange portion 113 positioned further to the rear of the vehicle than the channel portion 111. The channel portion 111 and each of the flange portions 112, 113 extend along the vehicle width direction Y. In this embodiment, a deformable impact-absorbing member 121, such as a nonwoven fabric or a sponge, is provided on the flange portion 112 and on the flange portion 113. Misalignment of the water drainage member 14 and the reinforcement 100 accompanying vibration, etc. of the vehicle 1 can also be suppressed by means of the material, etc. of the impact-absorbing member 121. Additionally, the presence of the impact-absorbing member 121 makes it possible to reduce sound which is generated from a contact portion between the water drainage member 14 and the reinforcement 100.

When the water drainage member 14 is mounted on the reinforcement 100, the flange portion 113 is first of all inserted into the gripping portion 37. By this means, the gripping portion 37 grips the flange portion 113 through the impact-absorbing member 121. At this time, a tip end of the flange portion 113 in the vehicle longitudinal direction X abuts the receiving portion 37*a* of the gripping portion 37 through the impact-absorbing member 121. The gripping portion 37 therefore also functions as a restricting portion for restricting movement of the reinforcement 100. The reinforcement 100 is then mated with the water drainage member 14 in such a way that the wide portions 102 are held between the gripping portion 37 and the restricting portion 38. As a result, the tip end of the flange portion 112 in the vehicle longitudinal direction X abuts the restricting portion 38. The biasing portion 39*b* of the holding portion 39 then elastically deforms so as to be placed further to the front of the vehicle than the flange portion 112, whereby a tip end of the biasing portion 39*b* abuts the flange portion 112 through the impact-absorbing member 121. At this time, the above-mentioned tip end is positioned below a first plate member 151 which will be described later, and is fixed by means of the flange portion 112. As a result, if the water drainage member 14 and the reinforcement 100 attempt to separate from each other along the vehicle vertical direction Z, upward movement of the water drainage member 14 and downward movement of the reinforcement 100 are obstructed by means of the holding portion 39. Accordingly, detachment of the front of the flange portion 112 and the water drainage member 14 in the vehicle vertical direction Z is suppressed by means of the water drainage passage 41 and the holding portion 39.

As described above, the biasing portion 39*b* of the holding portion 39 is placed further to the front of the vehicle than the flange portion 112 as a result of the biasing portion 39*b* elastically deforming so as to approach the first tip end portion 32. Here, the biasing portion 39*b* attempts to return to its original state by release of the force that was being imparted thereto, and the biasing portion 39*b* strikes against the impact-absorbing member 121 provided on the flange portion 112. By this means, the holding portion 39 imparts a biasing force to the flange portion 112 towards the rear of the vehicle, and the tip end of the flange portion 113 advantageously runs into the receiving portion 37*a*. In this embodiment, the holding portion 39 therefore also functions as a restricting portion for restricting movement of the reinforcement 100 in the vehicle longitudinal direction X.

In this embodiment, the reinforcement 100 comprises the first plate member 151, and a second plate member 152 positioned below the first plate member 151. The first plate member 151 and the second plate member 152 are I-shaped in plan view, and overlap each other in the vehicle vertical direction Z. Each of the first plate member 151 and the second plate member 152 is a processed metal sheet or alloy sheet, for example, and has a hat-shaped cross section. Only the first plate member 151 of the reinforcement 100 can be seen in plan view, but this is not limiting. The first plate member 151 and the second plate member 152 may be formed as a single piece by a known method from the point of view of enhancing rigidity of the reinforcement 100. The first plate member 151 comprises a plate-shaped section 151*a* (first plate-shaped section) constituting a part of the flange portion 112, and a plate-shaped section 151*b* constituting a part of the flange portion 113. The second plate member 152 comprises a plate-shaped section 152*a* (second plate-shaped section) constituting a different part of the flange portion 112, and a plate-shaped section 152*b* constituting a different part of the flange portion 113.

The plate-shaped sections 151*a*, 152*a* face the first tip end portion 32 in the vehicle longitudinal direction X and closely contact each other with no gap in the vehicle vertical direction Z. The plate-shaped section 151*a* protrudes further towards the front of the vehicle than the plate-shaped section 152*a*. In other words, a tip end of the plate-shaped section 151*a* and a tip end of the plate-shaped section 152*a* are not aligned with each other in the vehicle longitudinal direction X. A step is therefore provided by the tip end portion of the plate-shaped section 151*a* in the vehicle longitudinal direction X and the tip end portion of the plate-shaped section 152*a* in the vehicle longitudinal direction X. When the water drainage member 14 is mounted on the reinforcement 100, the biasing portion 39*b* of the holding portion 39 encroaches on this step. Specifically, the biasing portion 39*b* is positioned below the plate-shaped section 151*a*, as mentioned above, and abuts the plate-shaped section 152*a* through the impact-absorbing member 121.

The plate-shaped sections 151*b*, 152*b* face the second tip end portion 33 in the vehicle longitudinal direction X and closely contact each other with no gap in the vehicle vertical direction Z. A tip end of the plate-shaped section 151*b* in the vehicle longitudinal direction X and a tip end of the plate-shaped section 152*b* in the vehicle longitudinal direction X are aligned. When the water drainage member 14 is mounted on the reinforcement 100, the gripping portion 37 grips the plate-shaped sections 151*b*, 152*b* through the impact-absorbing member 121.

The water drainage member 14 according to this embodiment described above is I-shaped in plan view and is mounted on the vehicle 1 so as to lie across the opening 3 (sunroof opening). This water drainage member 14 is disposed below the gap between the front glass panel 11 and the rear glass panel 12 of the sunroof 10, which thereby allows water penetrating into the vehicle compartment from between the front glass panel 11 and the rear glass panel 12 to be caught by the body portion 21. Furthermore, each of the pair of water drainage portions 22, 22 has the main portion 31 which is connected to an end of the body portion 21 extending in the vehicle width direction Y, and extends in the vehicle longitudinal direction X. Consequently, the main portions 31 are each positioned below the edges of the opening 3, for example, which thereby makes it possible to prevent the ingress of water into the vehicle compartment from between the roof panel 2 and the sunroof 10. It is therefore possible, by means of this single water drainage member 14, to prevent the ingress of water into the vehicle compartment from the edges of the opening 3 and to prevent the ingress of water into the vehicle compartment from between the front glass panel 11 and the rear glass panel 12. Additionally, each of the pair of water drainage portions 22, 22 comprises the first wall portion 34 standing upright from the main portion 31 and positioned on the opposite side of the main portion 31 to the body portion 21 in the vehicle width direction Y. Consequently, for example, water that has flowed from the body portion 21 to the water drainage portions 22 along the vehicle width direction Y strikes the first wall portion 34. As a result, this water is unlikely to flow out over the main portion 31, and readily flows towards the first tip end portion 32 and/or the second tip end portion 33. The water on the water drainage portions 22 is then advantageously drained via the first tip end portion 32 and/or the second tip end portion 33. In addition, it is possible to suppress external leakage of the water on the main portion 31 caused by vehicle vibration, etc.

In this embodiment, the first tip end portion 32 is tapered towards the front of the vehicle, and the second tip end portion 33 is tapered towards the rear of the vehicle. The first tip end portion 32 and the second tip end portion 33 can therefore each streamline the flow of water while also increasing the flow rate of the water. Here, the first tip end portion 32 and the second tip end portion 33 are each substantially V-shaped as seen from the vehicle longitudinal direction X. The water is therefore concentrated in the central section of each of the first tip end portion 32 and the second tip end portion 33 in the vehicle width direction Y. As a result, the water readily flows straight ahead, rather than meandering, through each of the first tip end portion 32 and the second tip end portion 33, making the flow of water more streamlined and also achieving a further increase in the flow rate of the water. By this means, the water that has reached the water drainage portion 22 is more advantageously drained towards the central portion of the water drainage groove 15*b* via the first tip end portion 32 and/or the second tip end portion 33.

In this embodiment, each of the pair of water drainage portions 22, 22 further comprises: the second wall portion 35 which stands upright from the main portion 31 and is positioned further to the front of the vehicle than the body portion 21, on the opposite side of the main portion 31 to the first wall portion 34 in the vehicle width direction Y; and the third wall portion 36 which stands upright from the main portion 31 and is positioned further to the rear of the vehicle than the body portion 21, on the opposite side of the main portion 31 to the first wall portion 34 in the vehicle width direction Y, and, in the vehicle longitudinal direction X: one end 34*a* of the first wall portion 34 is positioned at the tip end of the first tip end portion 32, another end 34*b* of the first wall portion 34 is positioned at the tip end of the second tip end portion 33, one end 35*a* of the second wall portion 35 is positioned above the main portion 31, another end 35*b* of the second wall portion is positioned at the tip end of the first tip end portion 32, one end 36*a* of the third wall portion 36 is positioned above the main portion 31, and another end 36*b* of the third wall portion 36 is positioned between the main portion 31 and the second tip end portion 33 in the vehicle longitudinal direction X. In this case, it is possible to advantageously suppress external leakage of water on the main portion 31 caused by vehicle vibration, etc.

In this embodiment, the projection 52*b* that protrudes downwards is provided at the tip end 52*a* of the first tip end portion 32. Water that has reached the tip end 52*a* of the first tip end portion 32 is therefore drained via the projection 52*b*. As a result, this suppresses a situation in which drainage water travels around to the rear side via the back face of the second inclined portion 52, and the direction of water drainage from the tip end 52*a* is readily guided towards the front of the vehicle, which is the desired direction. Furthermore, the projection 62*b* that protrudes downwards is provided at the tip end 62*a* of the second tip end portion 33. Water that has reached the tip end 62*a* of the second tip end portion 33 is therefore drained via the projection 62*b*. As a result, this suppresses a situation in which drainage water travels around to the rear side via the back face of the second inclined portion 62, and the direction of water drainage from the tip end 62*a* is readily guided towards the rear of the vehicle, which is the desired direction.

In this embodiment, the water drainage member 14 is mounted on the reinforcement 100 included in the vehicle 1 and extending in the vehicle width direction Y, and each of the pair of water drainage portions 22, 22 comprises: the gripping portion 37 which is positioned below and further to the rear of the vehicle than the main portion 31 and grips the reinforcement 100; and the restricting portion 38 which is positioned below the main portion 31 and further to the front of the vehicle than the gripping portion 37 and restricts movement of the reinforcement 100 in the vehicle longitudinal direction X. The water drainage member 14 can therefore be fixed onto the reinforcement 100 by way of the gripping portion 37 and the restricting portion 38, so it is possible to suppress an increase in the number of components. Additionally, the water drainage member 14 is attached to the reinforcement 100, which means that the water drainage member 14 and the reinforcement 100 can be counted as a single member. As a result, there is no longer any need to take account of a space between the water drainage member 14 and the reinforcement 100 at the design stage. Consequently, there is no longer any need to maintain this space inside the vehicle 1 in which the sunroof 10 is installed, so the sunroof 10 can be made thinner. Furthermore, sunroof design can also be simplified.

When the water drainage member described in abovementioned Patent Document 1 is used, for example, the water drainage member and the reinforcing member are separate elements (see FIG. 3, etc. of Patent Document 1). In this case, it is necessary to take account of the space between the water drainage member and the reinforcing member. In contrast to this, an advantage of this embodiment lies in the fact that there is no need to take account of the space, as indicated above. Furthermore, the water drainage member described in Patent Document 1 is simply fixed in a suspended manner. Consequently, there is a possibility that the tip end of this water drainage member will sag if the water drainage member becomes larger as the sunroof becomes larger, etc., for example. When the space is taken into account in Patent Document 1, it is therefore also necessary to take account of sagging, etc. of the water drainage member. In contrast to this, according to this embodiment, the water drainage member 14 is fixed onto the reinforcement 100, as indicated above. This embodiment therefore also has an advantage in that there is no need to take account of sagging, etc. of the water drainage member 14. In addition, even if the reinforcement 100 is made larger from the point of view of increasing strength, etc., the water drainage member 14 is provided commensurately with the reinforcement 100.

In this embodiment, the reinforcement 100 comprises the plate-shaped section 151*a* which faces the first tip end portion 32 in the vehicle longitudinal direction X, and the plate-shaped section 152*a* which faces the first tip end portion 32 in the vehicle longitudinal direction X and is positioned below the plate-shaped section 151*a*, the plate-shaped section 151*a* protrudes further towards the front of the vehicle than the plate-shaped section 152*a*, and the holding portion 39 is positioned below the plate-shaped section 151*a* and imparts a biasing force to the plate-shaped section 152*a*. In this case, upward movement of the holding portion 39 is obstructed by the plate-shaped section 151*a*, so misalignment of the holding portion 39 caused by vibration, etc. of the vehicle 1 can be suppressed.

Variant examples of the embodiment above will be described below with reference to FIG. 6-8. In the following variant examples, parts which are the same as in the abovementioned embodiment will not be described. The following description will therefore focus mainly on the parts which are different from the abovementioned embodiment.

FIG. 6 is a schematic oblique view showing the main parts of a water drainage member according to a first variant example. As shown in FIG. 6, a water drainage member 14A is a moulding integrally moulded with the reinforcement 100. The water drainage member 14A is a moulding which is shaped using a metal die that accommodates the reinforcement 100, for example. A body portion 21A and water drainage portions 22A included in the water drainage member 14A are therefore formed directly on the first plate member 151 of the reinforcement 100. The gripping portion 37 and the holding portion 39 are therefore not formed on the water drainage portion 22A, unlike in the embodiment described above.

The water drainage member 14A according to the first variant example described above also demonstrates the same action and effects as the abovementioned embodiment. Additionally, the first variant example enables a gap between the body portion 21A and the first plate member 151 to be filled with a resin. As a result, rigidity of the body portion 21A can be further enhanced, so it is possible to suppress sagging, etc. in the central portion of the body portion 21A. In addition, since there is no longer any need to provide the water drainage member 14A with the gripping portion, etc. for attachment to the reinforcement 100, the impact-absorbing member (cushioning material) disposed on the gripping portion, etc. is not required. The number of components can therefore also be reduced.

Figure 7:
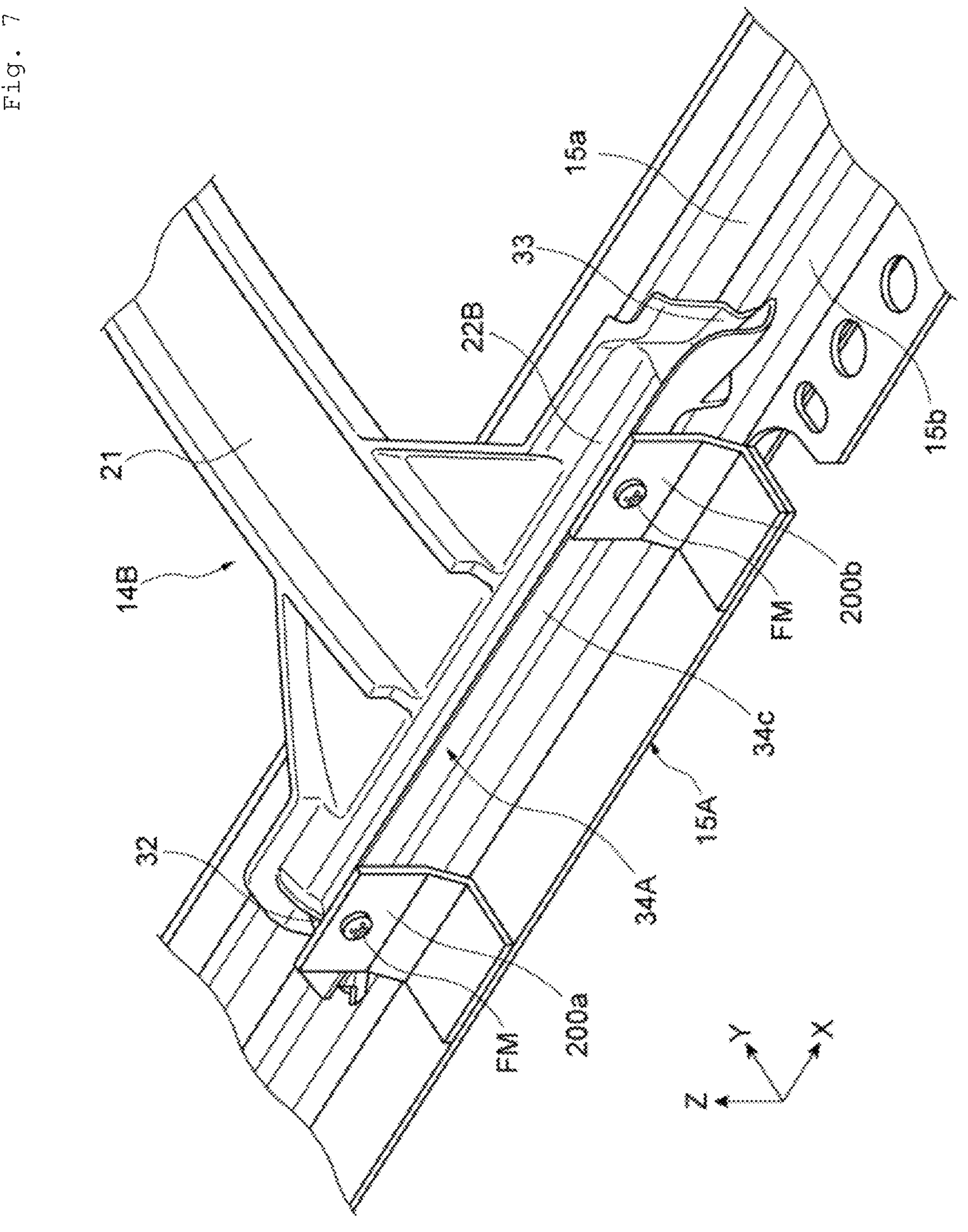
FIG. 7 is a schematic oblique view showing the main parts of a water drainage member and part of a sunroof side rail according to a second variant example.

FIG. 7 is a schematic oblique view showing the main parts of a water drainage member and part of a sunroof side rail according to a second variant example. As shown in FIG. 7, a water drainage member 14B is mounted on a pair of sunroof side rails 15A. In the second variant example, the water drainage member 14B and the sunroof side rails 15A are joined by using fastening members FM, such as screws, or nuts and bolts. The fastening members FM are inserted through openings (not depicted) provided in the first wall portion 34A and joined portions 200*a*, 200*b* which are fixed to the sunroof side rails 15A. Here, a water drainage portion 22B is fixed above the water drainage groove 15*b*. The joined portion 200*a* is positioned between the body portion 21 and the first tip end portion 32 in the vehicle longitudinal direction X. The joined portion 200*b* is positioned between the body portion 21 and the second tip end portion 33 in the vehicle longitudinal direction X. At least one of the first tip end portion 32 and the second tip end portion 33 may be in contact with the water drainage groove 15*b*.

The water drainage member 14B according to the second variant example described above also demonstrates the same action and effects as the abovementioned embodiment. It should be noted that the water drainage member 14B and the sunroof side rails 15A may also be joined without using the fastening members FM. For example, a locking portion which locks onto the sunroof side rails may be provided on the water drainage member, or a locking portion which locks onto the water drainage member may be provided on the sunroof side rails.

Figure 8:
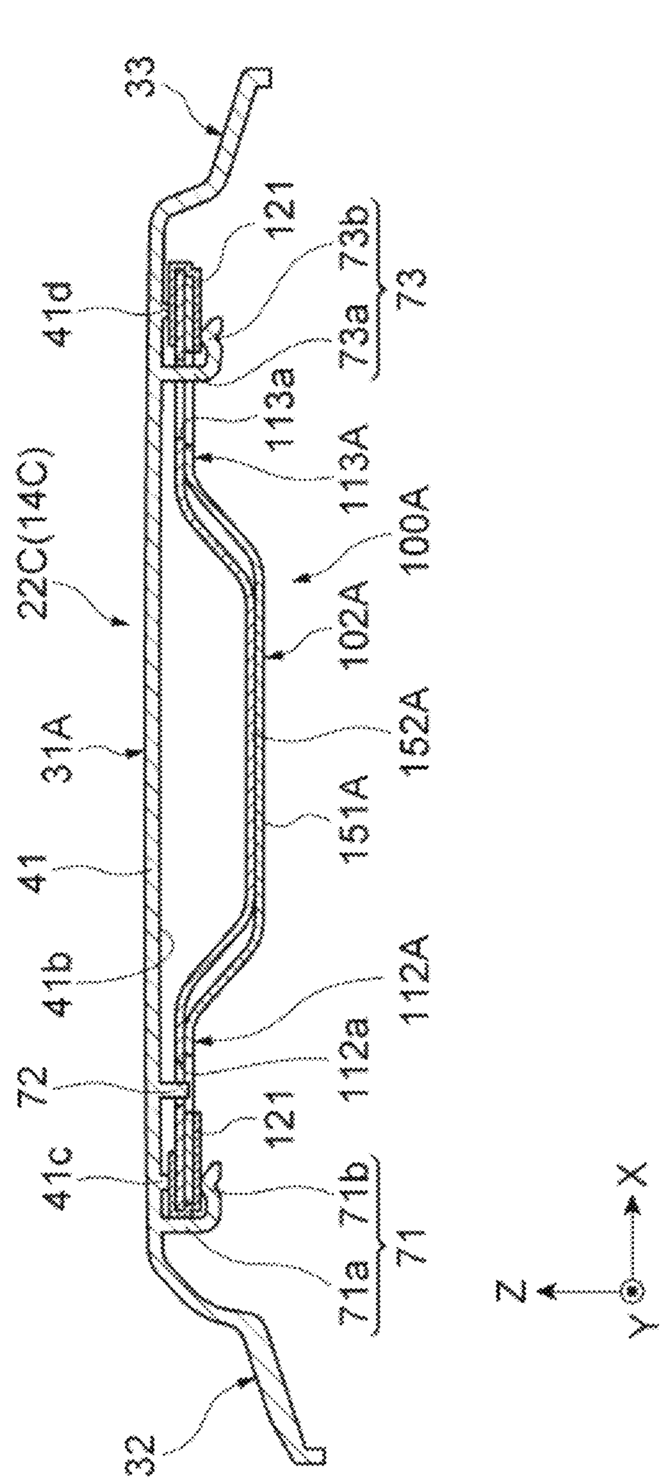
FIG. 8 is a schematic end face view showing the main parts of a water drainage member and the main parts of a reinforcement according to a third variant example.

FIG. 8 is a schematic end face view showing the main parts of a water drainage member and the main parts of a reinforcement according to a third variant example. As shown in FIG. 8, a water drainage portion 22C included in a water drainage member 14C does not comprise the gripping portion 37 positioned towards the rear of the vehicle, or the restricting portion 38 and holding portion 39 positioned towards the front of the vehicle (see FIG. 3(*b*)), unlike the abovementioned embodiment. Instead of these, the water drainage portion 22C comprises a gripping portion 71, a hook portion 72, and a latching portion 73. Furthermore, on wide portions 102A of a reinforcement 100A on which the water drainage member 14C is mounted, an opening 112*a* for the water drainage member 14C, which differs from the openings O, is provided in a flange portion 112A, and an opening 113*a* for the water drainage member 14C, which differs from the openings O, is provided on a flange portion 113A.

When the water drainage member 14C is mounted on another component, the gripping portion 71 constitutes the portion which grips that other component (to be described in detail later). The gripping portion 71 is positioned below a main portion 31A, between the first tip end portion 32 and the opening 112*a* in the vehicle longitudinal direction X. The gripping portion 71 comprises: a receiving portion 71*a* for receiving the other component, and a free end 71*b* which extends towards the rear of the vehicle from a lower end of the receiving portion 71*a*. The receiving portion 71*a* is a portion which protrudes downwards from the bottom face 41*b* of the water drainage passage 41. When the water drainage member 14C is mounted on another component, the lower end of the receiving portion 71*a* is positioned below that other component. The free end 71*b* is a portion which is capable of elastically deforming to suppress downward movement of another component when the water drainage member 14C is mounted on that other component. One part of the free end 71*b* extends upwards and is positioned below the protrusion 41*c* of the water drainage passage 41. For example, when the water drainage member 14C is mounted on another component, that other component is held between the free end 71*b* and the protrusion 41*c* while also abutting the receiving portion 71*a*.

The hook portion 72 is a rigid portion for restricting movement of another component in the vehicle longitudinal direction X when the water drainage member 14C is mounted on that other component. The hook portion 72 can therefore function as the restricting portion of the water drainage member 14C. The hook portion 72 protrudes downwards from the bottom face 41*b* of the water drainage passage 41. There is no particular limitation as to the shape of the hook portion 72. A side face of the hook portion 72 positioned towards the front of the vehicle may be orthogonal to or substantially orthogonal to the vehicle longitudinal direction X, from the point of view of advantageously demonstrating the effect of the hook portion 72 in terms of restricting movement of the other component.

The latching portion 73 is a portion which is latched onto another component when the water drainage member 14C is mounted on that other component (to be described in detail later). The latching portion 73 is positioned below the main portion 31A and further to the rear of the vehicle than the hook portion 72. The latching portion 73 comprises: a base end portion 73*a* protruding downwards from the bottom face 41*b* of the water drainage passage 41, and a free end 73*b* which extends towards the rear of the vehicle from the lower end of the base end portion 73*a*. When the water drainage member 14C is mounted on another component, the lower end of the base end portion 73*a* is positioned below that other component. The free end 73*b* is a portion which is capable of elastically deforming to suppress downward movement of another component when the water drainage member 14C is mounted on that other component. One part of the free end 73*b* extends upwards and is positioned below the protrusion 41*d* of the water drainage passage 41. For example, when the water drainage member 14C is mounted on another component, that other component is held between the free end 73*b* and the protrusion 41*d*.

When the water drainage member 14C is mounted on the reinforcement 100A, the flange portion 112A is inserted into the gripping portion 71. As a result, the gripping portion 71 grips the flange portion 112A through the impact-absorbing member 121. Here, the tip end of the flange portion 112A in the vehicle longitudinal direction X abuts the receiving portion 71*a* of the gripping portion 71 through the impact-absorbing member 121. Accordingly, the gripping portion 71 also functions as the restricting portion for restricting movement of the reinforcement 100A. Furthermore, the latching portion 73 is inserted through the opening 113*a*, while the hook portion 72 is received inside the opening 112*a*, and the latching portion 73 is latched onto the flange portion 113A. At this time, the hook portion 72 may abut the edge of the opening 112*a*, and the base end portion 73*a* may abut the edge of the opening 113*a*.

The water drainage member 14C according to the third variant example described above is easily fitted to the reinforcement 100A and also demonstrates the same action and effects as the abovementioned embodiment. Additionally, a dimension of a portion of the water drainage portion 22C in the vehicle vertical direction Z which overlaps the reinforcement 100A can be reduced. The water drainage member 14C can be made more compact as a result. It should be noted that the gripping portion 71 and the hook portion 72 are positioned further towards the front of the vehicle than the latching portion 73 in the third variant example, but this is not limiting. For example, the latching portion 73 may be positioned towards the front of the vehicle, and the gripping portion 71 and the hook portion 72 may be positioned further to the rear of the vehicle than the latching portion 73. In this case, the latching portion 73 may be inserted through the opening 112*a*, and the hook portion 72 may be received in the opening 113*a*, for example. Furthermore, the latching portion 73 may also function as a gripping portion for gripping the flange portion 112A or the flange portion 113A. That is to say, the gripping portion may be provided on the opposite side to the hook portion 72 in the vehicle longitudinal direction X.

The water drainage member for a sunroof according to one aspect of the present invention is not limited to the embodiment and the variant examples described above. For example, the water drainage member may be for vehicle use. Furthermore, the water drainage member in the embodiment and variant examples described above is I-shaped in plan view, but this is not limiting. For example, the water drainage member may be C-shaped or S-shaped in plan view. When the water drainage member is C-shaped in plan view, the water drainage portions each comprise only one of the first tip end portion and the second tip end portion, for example. When the water drainage member is C-shaped in plan view, one water drainage portion comprises only one of the first tip end portion and the second tip end portion, while the other water drainage portion comprises only the other of the first tip end portion and the second tip end portion, for example.

The shape of the first tip end portion and the shape of the second tip end portion are different in the embodiment and variant examples described above, but this is not limiting. For example, the shape of the second tip end portion may be the same as the shape of the first tip end portion, or the shape of the first tip end portion may be the same as the shape of the second tip end portion. Alternatively, the second tip end portion may be connected to the front end of the main portion, and the first tip end portion may be connected to the rear end of the main portion.

In the embodiment and the variant examples described above, the projection that protrudes downwards is provided at each of the tip end of the first tip end portion and the tip end of the second tip end portion, but this is not limiting. For example, the projection that protrudes downwards may be provided at the tip end of only one of the first tip end portion and the second tip end portion.

Figure 9:
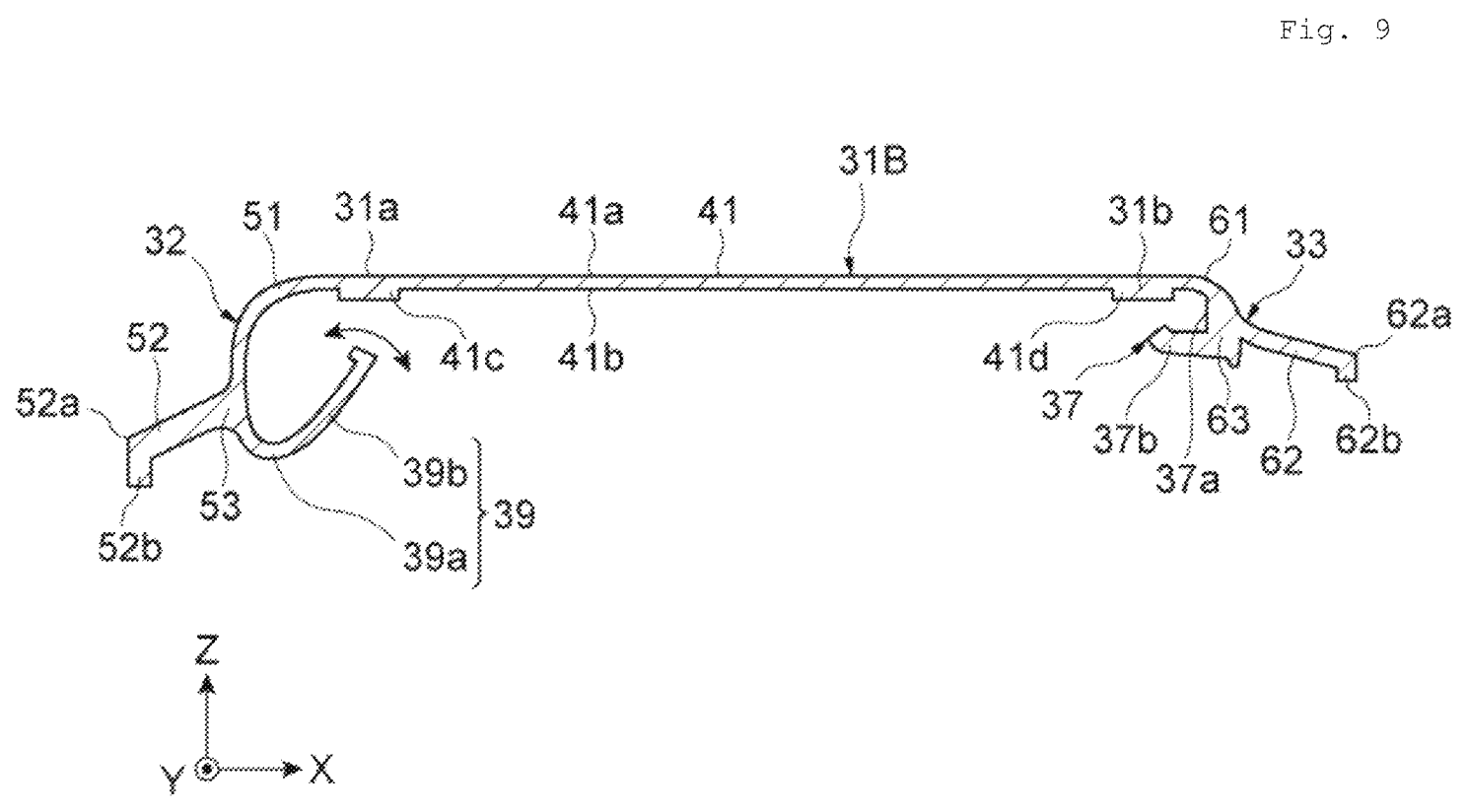

In the embodiment described above, the restricting portion and the holding portion extend from the rear of the first tip end portion, but this is not limiting. As shown in FIG. 9, for example, only the holding portion 39 may extend from the rear of the first tip end portion 32, without the restricting portion being provided on a main portion 31B. In this case, the holding portion 39 may function as the restricting portion. Furthermore, in the embodiment described above, the holding portion imparts a biasing force to the reinforcement, but this is not limiting. The holding portion need not impart a biasing force to the reinforcement. In this case, the holding portion may comprise a rigid portion which is pivotable about the base end portion, instead of comprising the biasing portion which is elastically deformable.

In the embodiment and the variant examples described above, the reinforcement comprises the first plate member and the second plate member, but this is not limiting. For example, the reinforcement may be a single processed plate member. In this case, differences in the thickness dimension of the reinforcement tend to be smaller than in a reinforcement formed by two plate members. Mounting defects, etc. of the water drainage member caused by the thickness of the reinforcement are therefore less likely to occur. Moreover, when the holding portion is provided on the water drainage member, the step for provision of the holding member may be provided on this single plate member.

KEY TO SYMBOLS

1 . . . Vehicle; 2 . . . Roof panel; 3 . . . Opening (sunroof opening); 10 . . . Sunroof; 11 . . . Front glass panel; 12 . . . Rear glass panel; 14, 14A, 14B . . . Water drainage member; 15, 15A . . . Sunroof side rail; 15*b* . . . Water drainage groove; 21, 21A . . . Body portion; 22, 22A, 22B, 22C . . . Water drainage portion; 31, 31A . . . Main portion; 31*a* . . . Front end; 31*b* . . . Rear end; 32 . . . First tip end portion; 33 . . . Second tip end portion; 34, 34A . . . First wall portion; 34*a*, 35*a*, 36*a* . . . One end; 34*b*, 35*b*, 36*b* . . . Other end; 35 . . . Second wall portion; 36 . . . Third wall portion; 37 . . . Gripping portion; 37*a* . . . Receiving portion; 37*b* . . . Free end; 38 . . . Restricting portion; 39 . . . Holding portion; 39*a* . . . Base end portion; 39*b* . . . Biasing portion; 100 . . . Reinforcement; 101 . . . Body portion; 102 . . . Wide portion; 111 . . . Channel portion; 112, 112A . . . Flange portion; 112*a* . . . Opening; 113, 113A . . . Flange portion; 113*a* . . . Opening; 121 . . . Impact-absorbing member; 151 . . . First plate member; 151*a* . . . Plate-shaped section (first plate-shaped section); 151*b* . . . Plate-shaped section (second plate-shaped section); 152 . . . Second plate member.

The invention claimed is:

1. A water drainage member for a sunroof, which is I-shaped in plan view and is mounted on a vehicle so as to lie across a sunroof opening, the water drainage member for the sunroof comprising: a body portion extending in a vehicle width direction; and a pair of water drainage portions positioned on both sides of the body portion in the vehicle width direction, wherein each of the pair of water drainage portions comprises: a main portion connected to the body portion and extending in a vehicle longitudinal direction; a first tip end portion connected to a front end of the main portion in the vehicle longitudinal direction; a second tip end portion connected to a rear end of the main portion in the vehicle longitudinal direction; and a first wall portion positioned on the opposite side of the main portion to the body portion in the vehicle width direction, and at least a part of the first tip end portion and at least a part of the second tip end portion are each positioned below the main portion, wherein each of the pair of water drainage portions further comprises: a second wall portion which is positioned further to the front of the vehicle than the body portion, on the opposite side of the main portion to the first wall portion in the vehicle width direction; and a third wall portion which is positioned further to the rear of the vehicle than the body portion, on the opposite side of the main portion to the first wall portion in the vehicle width direction, and in the vehicle longitudinal direction: one end of the first wall portion is positioned at a tip end of the first tip end portion, another end of the first wall portion is positioned at a tip end of the second tip end portion, one end of the second wall portion and one end of the third wall portion are each positioned above the main portion, and another end of the second wall portion is positioned at the tip end of the first tip end portion and/or another end of the third wall portion is positioned at the tip end of the second tip end portion.

2. The water drainage member for the sunroof according to claim 1, wherein the first tip end portion is tapered towards the front of the vehicle, and the second tip end portion is tapered towards the rear of the vehicle.

3. The water drainage member for the sunroof according to claim 1, wherein a projection that protrudes downwards is provided at a tip end of at least one of the first tip end portion and the second tip end portion.

4. The water drainage member for the sunroof according to claim 1, which is a moulding integrally moulded with a reinforcement included in the vehicle and extending in the vehicle width direction.

5. The water drainage member for the sunroof according to claim 1, which is mounted on a pair of side rails included in the sunroof, wherein each of the pair of water drainage portions is linked to the corresponding side rail.

6. A water drainage member for a sunroof, which is I-shaped in plan view and is mounted on a vehicle so as to lie across a sunroof opening, the water drainage member for the sunroof comprising: a body portion extending in a vehicle width direction; and a pair of water drainage portions positioned on both sides of the body portion in the vehicle width direction, wherein each of the pair of water drainage portions comprises: a main portion connected to the body portion and extending in a vehicle longitudinal direction; a first tip end portion connected to a front end of the main portion in the vehicle longitudinal direction; a second tip end portion connected to a rear end of the main portion in the vehicle longitudinal direction; and a first wall portion positioned on the opposite side of the main portion to the body portion in the vehicle width direction, and at least a part of the first tip end portion and at least a part of the second tip end portion are each positioned below the main portion, wherein each of the pair of water drainage portions further comprises: a second wall portion which is positioned further to the front of the vehicle than the body portion, on the opposite side of the main portion to the first wall portion in the vehicle width direction; and a third wall portion which is positioned further to the rear of the vehicle than the body portion, on the opposite side of the main portion to the first wall portion in the vehicle width direction, and in the vehicle longitudinal direction: one end of the first wall portion is positioned at a tip end of the first tip end portion, another end of the first wall portion is positioned at a tip end of the second tip end portion, one end of the second wall portion and one end of the third wall portion are each positioned above the main portion, and another end of the second wall portion is positioned between the main portion and the tip end of the first tip end portion in the vehicle longitudinal direction and/or another end of the third wall portion is positioned between the main portion and the tip end of the second tip end portion in the vehicle longitudinal direction.

7. A water drainage member for a sunroof, which is I-shaped in plan view and is mounted on a vehicle so as to lie across a sunroof opening, the water drainage member for the sunroof comprising: a body portion extending in a vehicle width direction; and a pair of water drainage portions positioned on both sides of the body portion in the vehicle width direction, wherein each of the pair of water drainage portions comprises: a main portion connected to the body portion and extending in a vehicle longitudinal direction; a first tip end portion connected to a front end of the main portion in the vehicle longitudinal direction; a second tip end portion connected to a rear end of the main portion in the vehicle longitudinal direction; and a first wall portion positioned on the opposite side of the main portion to the body portion in the vehicle width direction, and at least a part of the first tip end portion and at least a part of the second tip end portion are each positioned below the main portion, which is mounted on a reinforcement included in the vehicle and extending in the vehicle width direction, wherein each of the pair of water drainage portions comprises: a gripping portion which is positioned below the main portion in the vehicle longitudinal direction and grips the reinforcement; and a restricting portion which is positioned below the main portion in the vehicle longitudinal direction and restricts movement of the reinforcement in the vehicle longitudinal direction.

8. A water drainage member for a sunroof, which is I-shaped in plan view and is mounted on a vehicle so as to lie across a sunroof opening, the water drainage member for the sunroof comprising: a body portion extending in a vehicle width direction; and a pair of water drainage portions positioned on both sides of the body portion in the vehicle width direction, wherein each of the pair of water drainage portions comprises: a main portion connected to the body portion and extending in a vehicle longitudinal direction; a first tip end portion connected to a front end of the main portion in the vehicle longitudinal direction; a second tip end portion connected to a rear end of the main portion in the vehicle longitudinal direction; and a first wall portion positioned on the opposite side of the main portion to the body portion in the vehicle width direction, and at least a part of the first tip end portion and at least a part of the second tip end portion are each positioned below the main portion, which is mounted on a reinforcement included in the vehicle and extending in the vehicle width direction, wherein each of the pair of water drainage portions comprises: a gripping portion which is positioned below the main portion at one of the front of the vehicle and the rear of the vehicle, and grips the reinforcement; and a hook portion which is positioned at the other of the front of the vehicle and the rear of the vehicle from the gripping portion, and protrudes downwards from a bottom face of the main portion, and the hook portion is positioned within an opening provided in the reinforcement.

* * * * *